(12) United States Patent
Cook

(10) Patent No.: US 8,714,760 B2
(45) Date of Patent: May 6, 2014

(54) ALL REFLECTIVE REAL PUPIL TELECENTRIC IMAGER

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/495,725

(22) Filed: Jun. 13, 2012

(65) Prior Publication Data

US 2013/0335839 A1 Dec. 19, 2013

(51) Int. Cl.
*G02B 5/10* (2006.01)
*G02B 5/08* (2006.01)

(52) U.S. Cl.
USPC .......................................... 359/859; 359/861

(58) Field of Classification Search
USPC ......................................................... 359/859
See application file for complete search history.

(56) References Cited

U.S. PATENT DOCUMENTS

| 4,226,501 | A | 10/1980 | Shafer |
| 4,240,707 | A | 12/1980 | Wetherell et al. |
| 4,733,955 | A | 3/1988 | Cook |
| 6,902,282 | B2* | 6/2005 | Cook ............................ 359/859 |
| 7,602,548 | B2 | 10/2009 | Thorwirth et al. |
| 2003/0179444 | A1 | 9/2003 | Cook |
| 2010/0110539 | A1 | 5/2010 | Cook |

FOREIGN PATENT DOCUMENTS

| DE | 4314499 A1 | 11/1994 |
| DE | 19649841 A1 | 6/1997 |
| EP | 2073049 A1 | 6/2009 |
| FR | 2678742 A1 | 1/1993 |

* cited by examiner

*Primary Examiner* — Jade R Chwasz
(74) *Attorney, Agent, or Firm* — Lando & Anastasi, LLP

(57) ABSTRACT

A reflective optical form that has both a telecentric image and a real entrance pupil. In one example, a non-relayed optical imaging system includes a real entrance pupil configured to admit a beam of electromagnetic radiation, an image plane, and a reflective triplet including a negative primary mirror, a positive secondary mirror optically coupled to the primary mirror, a negative tertiary mirror optically coupled to the secondary mirror, the reflective triplet configured to receive the beam of electromagnetic radiation from the real entrance pupil and to focus the beam of electromagnetic radiation onto the image plane to form a telecentric image at the image plane.

10 Claims, 5 Drawing Sheets

ALL REFLECTIVE REAL PUPIL TELECENTRIC IMAGER

BACKGROUND

Imaging systems for electromagnetic radiation, particularly that portion of the radiation spectrum corresponding to visual and infrared radiation, are widely used, for example, for imaging objects at long distances by telescope. It is generally recognized that imaging systems require a minimum of three optical elements in order to provide the minimum number of parameters which are necessary to correct for spherical aberration, coma, astigmatism and field curvature. A telescope or imaging system which is comprised of three optical elements is generally known as a triplet. One common type of triplet is constructed using reflective optical elements, and is typically comprised of a negative powered mirror interposed between two positive powered mirrors. In a conventional reflective triplet light entering the system from a distant object first impinges on a primary mirror, is reflected onto a secondary mirror, is then further reflected to a tertiary mirror and finally is focused to an image plane where an image of the distant object is formed.

U.S. Pat. No. 4,420,707 to Wetherell et al. describes an all-reflecting, eccentric field, non-relayed optical system that is comprised of a reflective triplet consisting of a negative convex secondary mirror positioned between a positive concave primary mirror and a positive concave tertiary mirror, and has an aperture stop on the optical axis, the aperture stop being physically located on the secondary mirror. The entrance pupil of this optical system is virtual, that is, it is located a large distance behind the optical system. A disadvantage of having a virtual entrance pupil is that a significant amount of beam wander will occur in front of the optical system. Such beam wander detrimentally affects the image quality in situations requiring the viewing of objects through a small port or window. However, as a natural consequence of the aperture stop location on the secondary mirror, all of the imaging f-cones are substantially normally incident on the image plane (the telecentric condition).

U.S. Pat. No. 7,733,955 to Cook describes a reflective triplet including a positive concave primary mirror, a negative convex secondary mirror and a positive concave tertiary mirror, the mirrors being arranged such that the system formed thereby is used off-axis in both aperture and field angle. Positioned in front of the primary mirror is an entrance pupil for admitting into the optical system the radiation to be imaged. With this pupil location, there is essentially no beam wander at this point, and this is an advantage in viewing objects through a small port or window. However, as a natural consequence of the front aperture stop location, the imaging f-cones will exhibit a variation of incident angles on the imaging plane (departure from the telecentric condition), and this can be disadvantageous in certain circumstances or applications.

SUMMARY OF INVENTION

Aspects and embodiments are directed to a reflective optical form that has both a telecentric image and a real entrance pupil, thereby offering numerous advantages over conventional reflective triplets. For example, having a telecentric image may offer advantage in the design of multi-layer dielectric spectral filter coatings located immediately in front of the imaging detector (.e.g., a focal plane array).

According to one embodiment, a non-relayed optical imaging system comprises a real entrance pupil configured to admit a beam of electromagnetic radiation, an image plane, and a reflective triplet including a negative primary mirror, a positive secondary mirror optically coupled to the primary mirror, a negative tertiary mirror optically coupled to the secondary mirror, the reflective triplet configured to receive the beam of electromagnetic radiation from the real entrance pupil and to focus the beam of electromagnetic radiation onto the image plane to form a telecentric image at the image plane.

In one example, the non-relayed optical imaging system further comprises an imaging detector located at the image plane. In one example, the negative primary mirror is arranged to receive the beam of electromagnetic radiation from the entrance pupil and to reflect the beam of electromagnetic radiation onto the positive secondary mirror, the positive secondary mirror is arranged to receive the beam of electromagnetic radiation from the negative primary mirror and to reflect the beam of electromagnetic radiation onto the negative tertiary mirror, and the negative tertiary mirror is arranged to receive the beam of electromagnetic radiation from the positive secondary mirror and to reflect the beam of electromagnetic radiation onto the image plane. In one example, the cross-scan field of view of the optical imaging system is approximately 15 degrees. In another example, the ratio of a physical length of the reflective triplet to an effective focal length of the reflective triplet is approximately 0.44×. In another example, the speed of the optical imaging system is approximately F/6.4. The non-relayed optical imaging system may further comprise an aspheric corrector mirror located between the real entrance pupil and the primary mirror. In one example the aspheric corrector mirror is a zero power mirror. In another example, the cross-scan field of view of the optical imaging system is approximately 10 degrees. In another example, the speed of the optical imaging system is approximately F/4.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a reflective optical system, such as a reflective triplet in some examples, which unlike conventional systems, both is telecentric and provides a real entrance pupil. A real entrance pupil is desired in some applications to minimize the size of viewing windows and/or pointing mirrors, and to provide a convenient calibrator interface. As discussed above, a virtual entrance pupil results in large beam wander, making systems with virtual entrance pupils unsuitable for numerous applications. A telecentric image (parallel chief rays) may be advantageous in that it may simplify the design and fabrication of narrow band spectral filters over the imaging detector. Conventional reflective triplets do not provide both a telecentric image and a real entrance pupil. For example, U.S. Pat. No. 4,240,707 discussed above describes an optical system that is telecentric, but has a virtual entrance pupil. U.S. Pat. No. 4,733,955 discussed above has a real entrance pupil, but is far from telecentric. Aspects and embodiments provide a reflective optical form that has both a telecentric image and a real entrance pupil, thereby offering numerous advantages over conventional reflective triplets.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
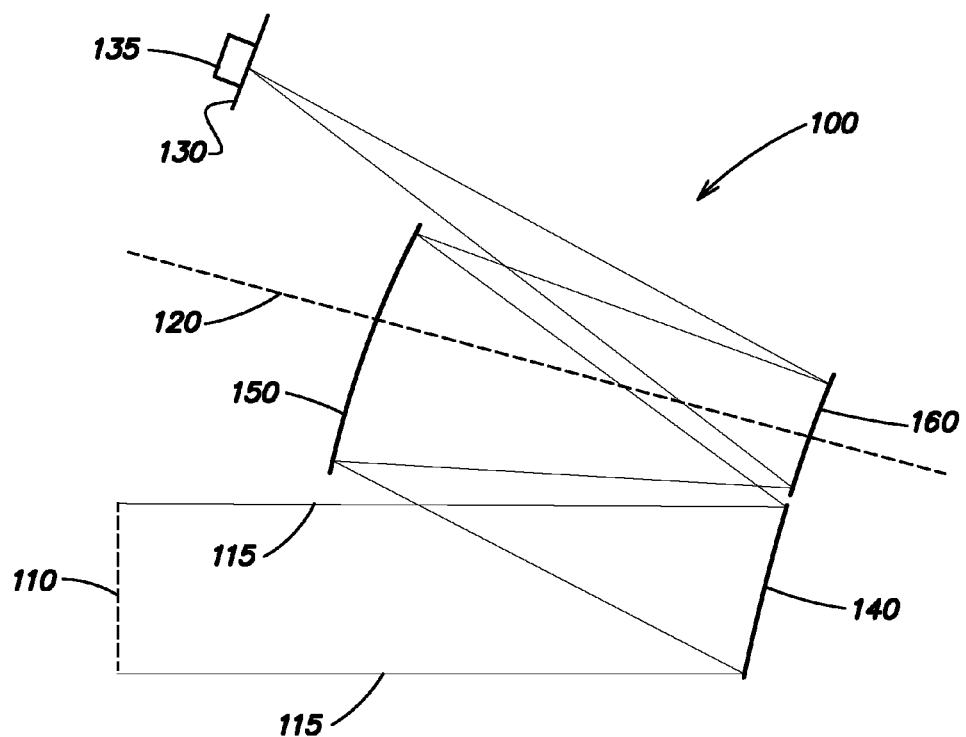
FIG. 1 is a side elevational schematic illustrating one example of an all-reflecting, three mirror, nonrelayed optical system according to aspects of the present invention.
Figure 2:
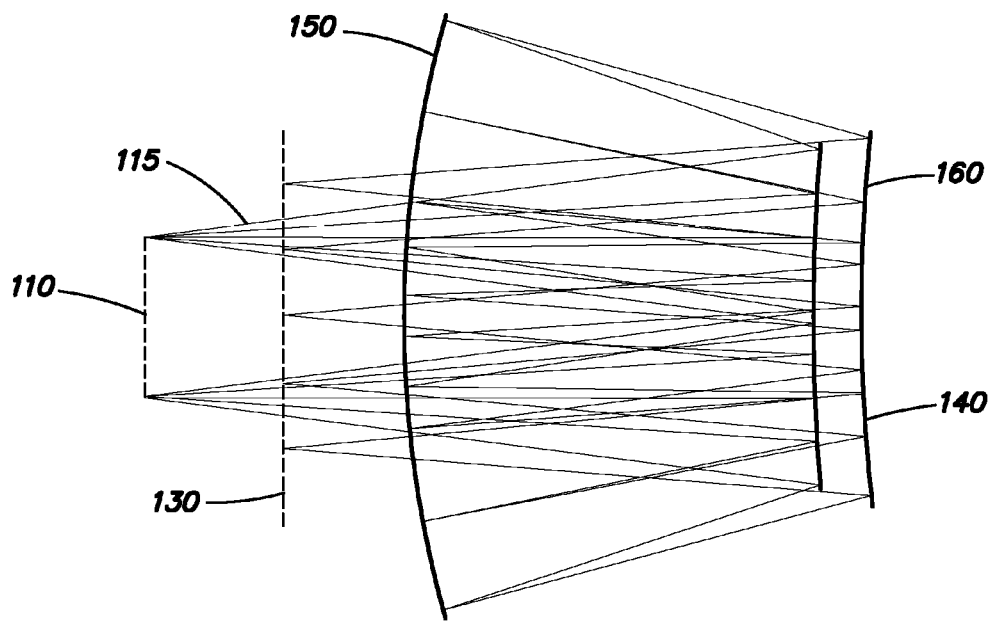
FIG. 2 is a plan view of the optical system of FIG. 1.
Figure 3:
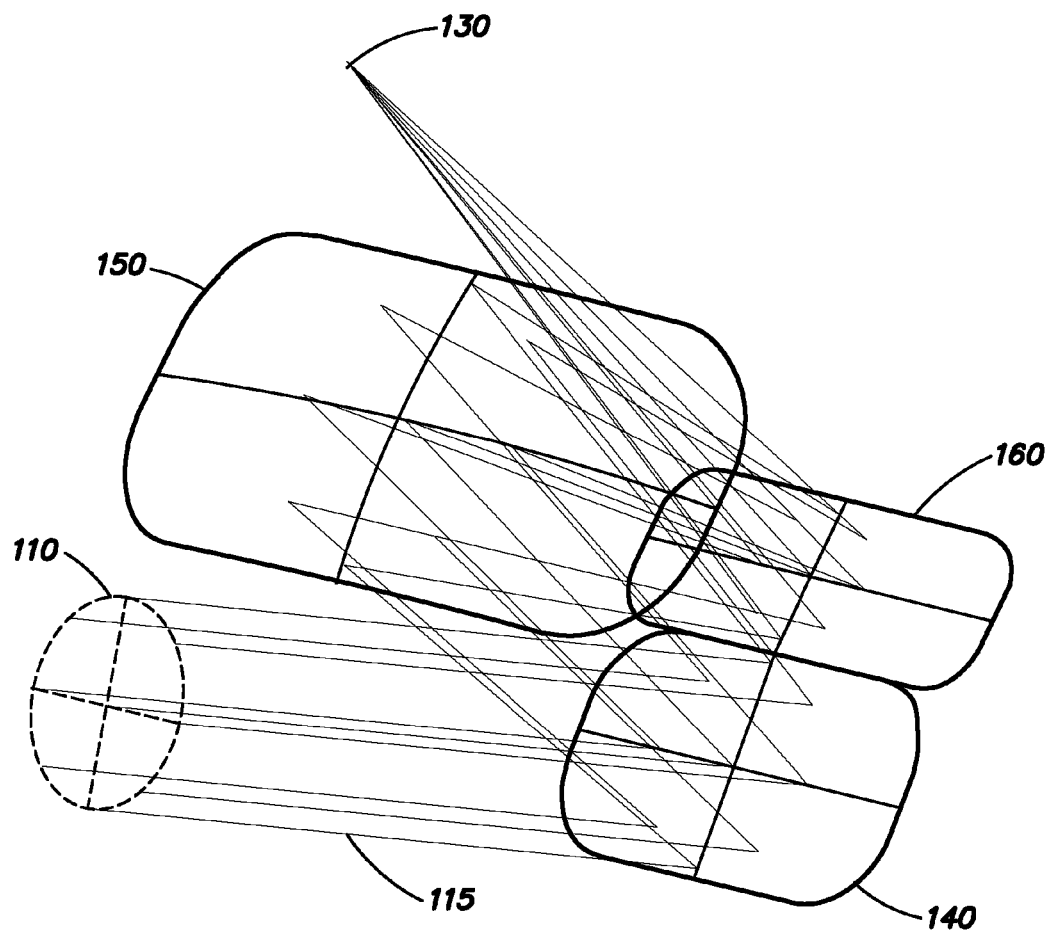
FIG. 3 is an isometric view of the optical system of FIG. 1.

Referring to FIGS. 1, 2 and 3, there is illustrated one example of all-reflective, non-relayed optical system 100 having a real and accessible entrance pupil 110 according to one embodiment. The optical system has an optical axis 120 and includes three off-axis mirrors and an image plane 130. The mirrors include a primary mirror 140, a secondary mirror 150 and a tertiary mirror 160. Disposed at or on the image plane 130 is typically an imaging detector 135. The real entrance pupil 110 is located off-axis and admits a beam 115 of electromagnetic radiation originating from a distance source (not shown). As illustrated in FIG. 1, the beam 115 impinges initially on the primary mirror 140, is reflected onto the secondary mirror 150 which reflects the beam onto tertiary mirror 160, and is then reflected by the tertiary mirror to impinge on the imaging detector 135 located at the image plane 130. The real entrance pupil 110, by definition, precludes the presence of a virtual entrance pupil.

According to one embodiment, the primary mirror 140 is a negative convex mirror, the secondary mirror 150 is a positive concave mirror, and the tertiary mirror 160 is a negative convex mirror. In one embodiment, each of these mirrors is generally a conic section; however, each may also contain higher order aspheric terms in the surface description. Thus, the power distribution of the reflective triplet formed by the primary, secondary and tertiary mirrors is −, +, −. As discussed above, in contrast, the power distribution of the classical reflective triplet is +, −, +. In one example, the two negative power mirrors (140, 160) have approximately equal power and about half the power of the positive power mirror (150), thus satisfying the zero-Petzval sum or flat field condition. According to certain examples, the three mirror optical system of FIGS. 1-3 is very compact, having a physical length to focal length ratio of about 0.44×.

Table 1 provides an optical prescription for an example of the optical system illustrated in FIGS. 1-3. The optical prescription for this example of the optical system may be generated using an equation which is an industry standard and which would be known to those skilled in the art. It is to be appreciated however, that the prescription given in Table 1 is merely exemplary, and that the prescriptions of various embodiments of the optical system 100 are determined by the intended imaging task to be performed by the optical system. The units in Table 1 are in inches.

In the example corresponding to the prescription given in Table 1, the following parameters of the optical system apply. The aperture stop offset from the optical axis 120 is −4.269 inches, and the stop diameter is 2.5 inches. The field offset from the optical axis is −14.881 degrees. The cross-scan field of view (FOV) is 15 degrees. The field average focal length is 16.1 inches. The nominal speed is F/6.4. The physical length to effective focal length ratio is 0.44, and the field of view average root-mean-squared (RMS) wavefront error (WFE) is 0.027 micrometers.

TABLE 1

| Surface | Element | Rd | CC | Ad | Ae | Af | Ag | Y Dec | Y tilt | Thk | Matl |
|---|---|---|---|---|---|---|---|---|---|---|---|
| 1 | Stop | Inf | | | | | | | | 11.037 | Air |
| 2 | 140 | 35.153 | | 6.914E−05 | 3.470E−07 | 2.070E−08 | −4.303E−10 | −1.117 | −0.707 | −7.133 | Refl |
| 3 | 150 | 17.496 | −0.47029 | 3.570E−05 | 1.463E−07 | 4.724E−10 | 8.180E−12 | −1.057 | −0.641 | 7.090 | Refl |
| 4 | 160 | 33.772 | | 1.112E−04 | 6.498E−07 | 6.300E−09 | 2.905E−10 | −1.093 | −2.427 | −9.913 | Refl |
| 5 | Focus | Inf | | | | | | 3.929 | −8.550 | | Air |

Figure 4:
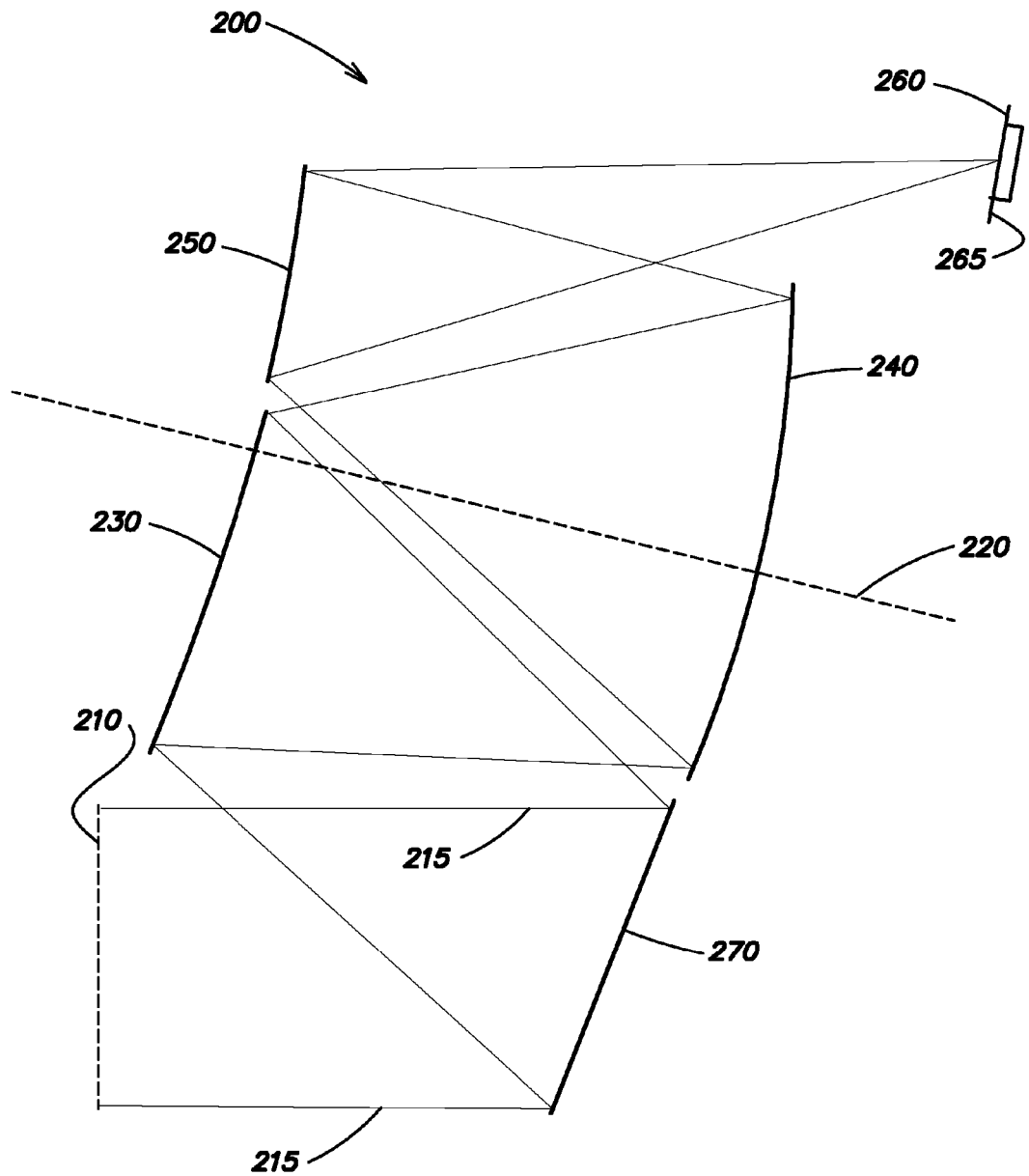
FIG. 4 is a side elevational schematic illustrating another example of a reflective, nonrelayed optical system according to aspects of the present invention.
Figure 5:
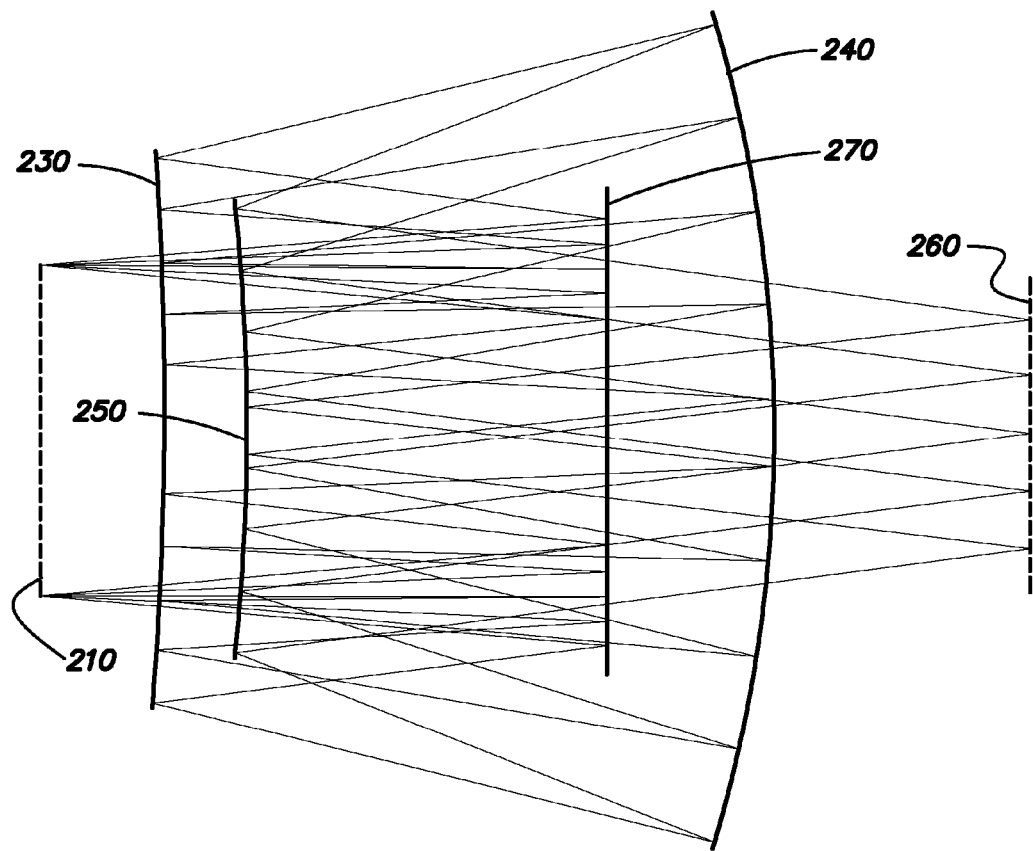
FIG. 5 is a plan view of the optical system of FIG. 4.
Figure 6:
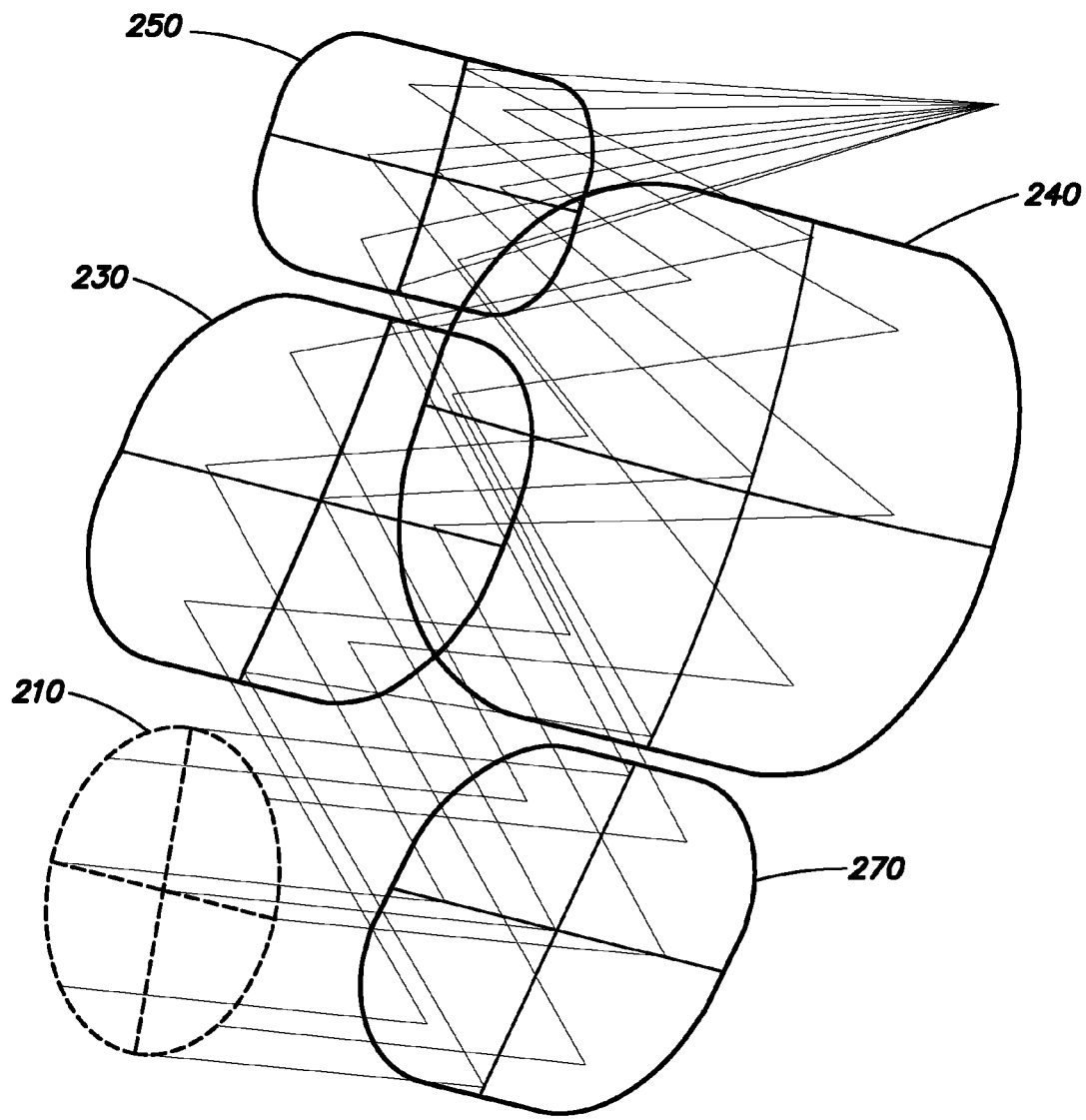
FIG. 6 is an isometric view of the optical system of FIG. 4.

According to another embodiment, the three-mirror form of the optical system described above may be augmented for better imager quality at faster optical speeds with a zero-power aspheric corrector mirror between the entrance pupil and the first powered mirror. FIGS. 4-6 illustrate one example of a non-relayed optical system that includes a reflective triplet in combination with a zero-power aspheric corrector mirror. Similar to optical system 100 discussed above, optical system 200 includes a real and accessible entrance pupil 210 located off-axis (with respect to the optical axis 220 of the system) and configured to admit a beam 215 of electromagnetic radiation originating from a distance source (not shown). The optical system 200 includes a reflective triplet formed of a negative power secondary mirror 230, a positive power tertiary mirror 240, a negative power quaternary mirror 250, which directs and focuses the beam 215 of electromagnetic radiation to an image plane 260. As discussed above, an imaging detector 265, such as a focal plane array, for example, may be located on the image plane 260. The zero-power aspheric beam corrector mirror, also referred to as the primary mirror, 270 is located between the real entrance pupil 210 and the secondary mirror 230. Thus, the power distribution of the four-mirror optical system 200 is 0, −, +, −.

In operation, the beam 215 of electromagnetic radiation enters through the entrance pupil 210, impinges on the primary mirror 270 and is reflected onto the secondary mirror 230. The beam is reflected by the secondary mirror 230 onto the tertiary mirror 240, reflected from the tertiary mirror onto the quaternary mirror 250, and reflected from the quaternary mirror onto the imaging detector 265 located at the image plane 260. In one example, the secondary mirror 230 is a negative convex mirror, the tertiary mirror 240 is a positive concave mirror, and the quaternary mirror 250 is a negative convex mirror. In one embodiment, each of the powered mirrors is generally a conic section; however, each may also contain higher order aspheric terms in the surface description. The zero-power corrector mirror 270 may generally only have higher order aspheric terms in the surface description. In one example, the two negative power mirrors have approximately equal power and about half the power of the positive power mirror, thus satisfying the zero-Petzval sum or flat field condition. Each of the primary, secondary, tertiary and quaternary mirrors may be off-axis, as illustrated in FIG. 4.

Table 2 provides an optical prescription for an example of the optical system illustrated in FIGS. 4-6. The optical prescription for this example of the optical system may be generated using an equation which is an industry standard and which would be known to those skilled in the art. It is to be appreciated however, that the prescription given in Table 2 is merely exemplary, and that the prescriptions of various embodiments of the optical system 200 are determined by the intended imaging task to be performed by the optical system. The units in Table 2 are in inches.

In the example corresponding to the prescription given in Table 2, the following parameters of the optical system apply. The aperture stop offset from the optical axis 220 is −7.023 inches, and the stop diameter is 4 inches. The field offset from the optical axis is −14.145 degrees. The cross-scan field of view (FOV) is 10 degrees. The field average focal length is 15.97 inches. The nominal speed is F/4. The physical length to effective focal length ratio is 0.44×.

constants of the specific mirror surfaces. With respect to an xyz coordinate system, consider the optical axis as the z-axis, with the y-axis taken in the tangential plane and the x-axis taken in the sagittal plane. The column designated Y Dec is the decentering distance. The decentering is measured in units of linear measurement along the y axis, and represents a displacement of the vertex of the surface from the origin of the coordinate system. The column designated Y tilt describes the tilt. Each of the mirror surfaces may be formed as a surface of revolution, this being done by revolving a conic section about an axis. The Y tilt column gives the tilt of this axis in the yz plane. A positive number of degrees of tilt represents a tilting in the counterclockwise direction with reference to the xyz coordinate system.

Thus, aspects and embodiments provide a reflective, eccentric (i.e., the optical system may be used off-axis in both aperture and field of view), flat-field, non-relayed imager having both a real entrance pupil and a telecentric final image. As discussed above, having a real entrance pupil offers numerous advantages, such as reduced beam wander and improved image quality (compared to systems with a virtual entrance pupil), in addition to the fact that the entrance pupil may be made small therefore making it compatible with imaging applications where a viewing window is required. Further imaging applications where a real and accessible entrance pupil is advantageous include those where an object space scanning or pointing mirror is kept small in size. In addition, the real entrance pupil provides an excellent interface for a full-aperture, full-field of view calibrator. Furthermore, having a telecentric final image may be advantageous in imaging applications where spectral filters are desired in front of the imaging detector.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-relayed optical imaging system comprising:
a real entrance pupil configured to admit a beam of electromagnetic radiation;
an image plane; and
a reflective triplet including a negative primary mirror, a positive secondary minor optically coupled to the primary mirror, a negative tertiary mirror optically coupled to the secondary mirror, the reflective triplet configured to receive the beam of electromagnetic radiation from the real entrance pupil and to focus the beam of electromagnetic radiation onto the image plane to form a telecentric image at the image plane.

TABLE 2

| Surface | Element | Rd | CC | Ad | Ae | Af | Ag | Y Dec | Y tilt | Thk | Matl |
|---|---|---|---|---|---|---|---|---|---|---|---|
| 1 | Stop | Inf | | | | | | | | 8.963 | Air |
| 2 | 270 | Inf | | 1.530E−05 | −1.412E−08 | 5.187E−10 | −3.635E−12 | −0.567 | −7.831 | −6.920 | Refl |
| 3 | 230 | −43.792 | | −2.054E−05 | −2.632E−07 | 4.430E−09 | −1.257E−10 | 0.106 | −2.165 | 6.916 | Refl |
| 4 | 240 | −17.340 | −0.62379 | −2.900E−05 | −1.144E−07 | 2.325E−10 | −6.195E−12 | 0.007 | −0.034 | −6.982 | Refl |
| 5 | 250 | −27.822 | | −6.648E−05 | −2.618E−07 | −1.169E−08 | 4.599E−11 | 0.578 | 0.078 | 8.746 | Refl |
| 6 | Focus | Inf | | | | | | 6.508 | 1.599 | | Air |

In Tables 1 and 2, the column designated Rd is the radius in units of linear dimension, e.g., inches or centimeters of the specific mirror surfaces. The minus sign indicates that the center of curvature is to the left of the mirror surface. The column designated CC is the conic constant which is equal to the negative squared value of the eccentricity of a conic section (a planar cut through a double sheeted conic surface). The columns designated Ad, Ae, Af and Ag are the aspheric 2. The non-relayed optical imaging system of claim 1, further comprising an imaging detector located at the image plane.

3. The non-relayed optical imaging system of claim 1, wherein the negative primary minor is arranged to receive the beam of electromagnetic radiation from the entrance pupil and to reflect the beam of electromagnetic radiation onto the positive secondary mirror, the positive secondary mirror is arranged to receive the beam of electromagnetic radiation from the negative primary mirror and to reflect the beam of electromagnetic radiation onto the negative tertiary mirror, and the negative tertiary mirror is arranged to receive the beam of electromagnetic radiation from the positive secondary mirror and to reflect the beam of electromagnetic radiation onto the image plane.

4. The non-relayed optical imaging system of claim 1, wherein a cross-scan field of view of the non-relayed optical imaging system is approximately 15 degrees.

5. The non-relayed optical imaging system of claim 1, wherein a ratio of a physical length of the reflective triplet to an effective focal length of the reflective triplet is approximately 0.44×.

6. The non-relayed optical imaging system of claim 1, wherein a speed of the non-relayed optical imaging system is approximately F/6.4.

7. The non-relayed optical imaging system of claim 1, further comprising an aspheric corrector mirror located between the real entrance pupil and the primary mirror.

8. The non-relayed optical imaging system of claim 7, wherein the aspheric corrector mirror is a zero power mirror.

9. The non-relayed optical imaging system of claim 7, wherein a cross-scan field of view of the non-relayed optical imaging system is approximately 10 degrees.

10. The non-relayed optical imaging system of claim 7, wherein a speed of the non-relayed optical imaging system is approximately F/4.

\* \* \* \* \*

UNITED STATES PATENT AND TRADEMARK OFFICE
CERTIFICATE OF CORRECTION

PATENT NO.         : 8,714,760 B2                                                    Page 1 of 1
APPLICATION NO.    : 13/495725
DATED              : May 6, 2014
INVENTOR(S)        : Lacy G. Cook It is certified that error appears in the above-identified patent and that said Letters Patent is hereby corrected as shown below:

In the Claims

At column 6, claim number 1, line number 61, delete "minor" and replace with --mirror--.

At column 7, claim number 3, line number 5, delete "minor" and replace with --mirror--.

Signed and Sealed this
Eighth Day of July, 2014

Michelle K. Lee
*Deputy Director of the United States Patent and Trademark Office*